United States Patent
Goy et al.

[15] 3,640,390
[45] Feb. 8, 1972

[54] REPLACEABLE CARTRIDGE FILTER HOUSING

[72] Inventors: Thomas J. Goy, Canoga Park; Richard P. Knieriemen, Van Nuys; James E. Reading, Sepulveda, all of Calif.

[73] Assignee: Torite Enterprises, Inc., San Fernando, Calif.

[22] Filed: May 13, 1968

[21] Appl. No.: 728,674

[52] U.S. Cl. .......................... 210/130, 210/136, 210/186, 210/443, 210/455
[51] Int. Cl. .................................................... B01d 27/08
[58] Field of Search ............... 210/130, 136, 186, 232, 440, 210/443, 453, 451, 455, 479, DIG. 17

[56] References Cited

UNITED STATES PATENTS

| | | | |
|---|---|---|---|
| 1,849,042 | 3/1932 | Pickard et al. | 210/186 |
| 2,511,800 | 6/1950 | Wilkinson | 210/440 X |
| 3,258,122 | 6/1966 | Buckman et al. | 210/443 X |

Primary Examiner—Frank A. Spear, Jr.
Attorney—Victor Sepulveda

[57] ABSTRACT

A replaceable cartridge is provided for a screw-on-type oil filter useful in automobile engines, or the like. A floating cartridge is provided which is spring loaded against the bottom of a housing and held in place by spider-type clamping arrangement which is easily removable for the changing of the filter therein. There is also provided an antidrainback valve which is constructed of a single piece and prevents oil from draining back into the oil system when oil is not being pumped through the filter. The filter housing is provided with a plurality of coolant fins which permits the oil to be cooled as it is being pumped through the filter system.

13 Claims, 9 Drawing Figures

FIG. 1.

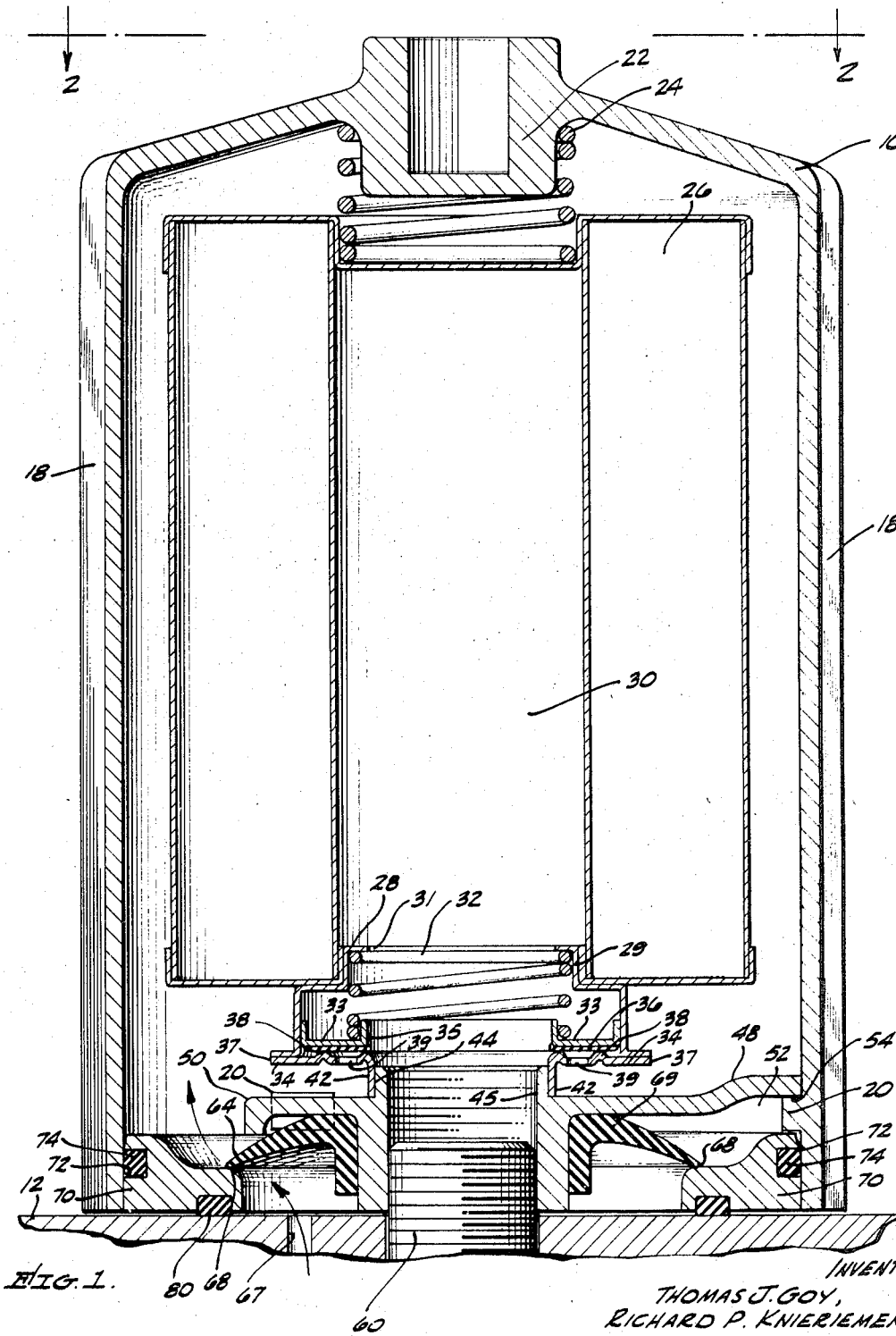

INVENTORS.
THOMAS J. GOY,
RICHARD P. KNIERIEMEN,
JAMES E. READING,
BY
AGENT

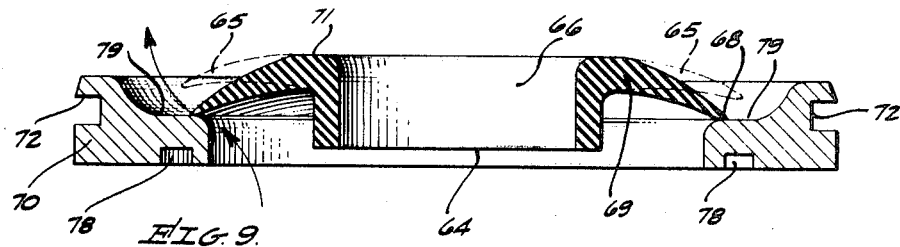
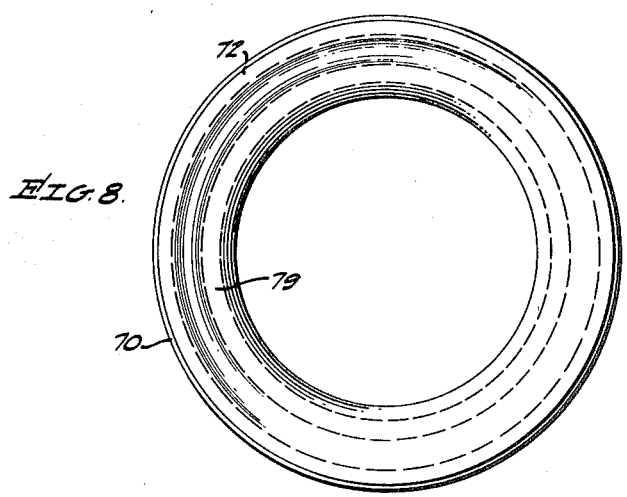
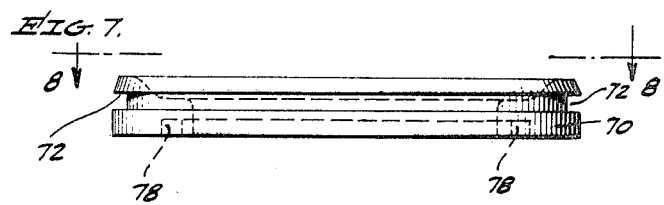
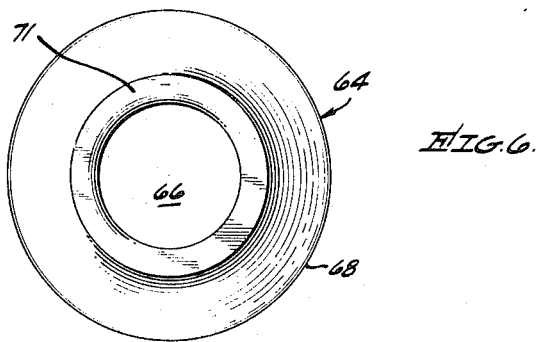
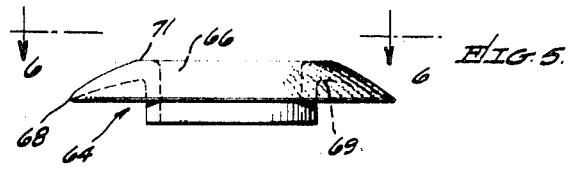
INVENTOR.
THOMAS J. GOY,
RICHARD P. KNIERIEMEN,
JAMES E. READING,
BY
AGENT.

REPLACEABLE CARTRIDGE FILTER HOUSING

BACKGROUND OF THE INVENTION

This invention relates to oil filter cartridge housings and more particularly to the type of oil filter cartridge housing which can be removed to replace the cartridge therein and the like.

Heretofore there has been provided, in the prior art systems, oil filter cartridges contained in a single housing unit. In these prior art systems when the cartridge therein becomes old and dirty, and a filter change is required, the complete cartridge unit, including the housing thereof, is removed and disposed of and a new complete unit, including the housing and the filter cartridge, is replaced. Such systems are quite expensive in that not only do the filter elements therein become dirty and need disposing of, but also the complete metallic housing is also disposed of. Some systems, as for example internal combustion engines, which use this type of replaceable oil filter unit, require that not only the oil filters be changed at frequent intervals, but also that the engines must perform to a certain quality. This is especially true in the new high-performance engines which are now being produced and operate under extreme oil pressure and temperatures.

There has been provided in the prior art oil filter housings which can be easily taken apart and the cartridge therein replaced when it has become dirty and no longer functions in the manner for which it was intended.

Also in the prior art systems fluid filters include antidrainback valves therein which prevent the dirty oil and sludge captured by the filter from being returned to the oil sump when the system to which it is coupled is no longer operating and the fluid system is not under pressure. The prior art antidrainback valves heretofore used have been elaborately constructed of numerous parts. In such systems when the filter cartridge is removed from the housing, disassembly of this elaborate valve becomes an involved and sometimes difficult job.

The present invention includes a new and improved antidrainback valve of single-structure solid construction composed of a relatively flexible material which is easily removed from the filter housing when cartridge changes are made. Too, because the antidrainback valve is solid construction and of a single piece, it is inexpensive to manufacture and, therefore, replacement of the part would not only be a simple matter but, also, the replacement of the part would be relatively inexpensive.

SUMMARY OF THE INVENTION

Briefly described, the present invention provides a fluid filter unit which may replace the fluid filters of the type which requires that the whole unit be replaced. The present invention comprises a self-contained filter assembly with a replaceable cartridge which includes a finned filter housing having a plurality of inwardly extending fins about the upper open end of the housing. A spring is positioned at the closed end of the housing in which the filter cartridge is placed upon and the spring urges the filter cartridge towards the open end of the housing. A spider-type clamping member comprising a center portion having a plurality of extending arms protruding therefrom which engage the locking ridges in the housing when pressure is brought to bear upon the spider clamp, the spring and the filter cartridge. The spider clamp can then be twisted to engage the locking ridges. A gasket retainer ring is positioned about the inner periphery of the housing at the upper end thereof which contains a first gasket seal between the housing and the gasket retainer ring and a second gasket placed about the outer periphery of the ring to seal the housing to the engine or other system to be protected by the filter system of this invention.

The filter unit of this invention has a threaded portion preferably within the spider clamp which may, for example, be threaded into a protruding threaded male fitting in the system to be protected which may provide the outlet part of the fluid system. An antidrainback valve is positioned between the spider clamp and the gasket retainer to assure drainback of contaminated fluids will not occur into the system when the fluid through the filter system is no longer under pressure. By this invention a unique antidrainback valve is provided which is constructed of a single element and which is composed of a relatively flexible material having a relatively thin annular skirt which bears upon the gasket retainer. When oil is contained in the filter cartridge and the system is not under pressure the weight of that oil bears upon the antidrainback valve to close off the inlet ports to keep the oil from passing thereinto.

It therefore becomes one object of this invention to provide a novel and improved oil filter cartridge housing which replaces the screw-on-type oil filters which can be disassembled and the oil filter cartridge therein can be replaced.

Another object of this invention is to provide a novel and improved oil filter cartridge which has improved cooling qualities added to the system.

Another object of this invention is to provide a novel and improved oil filter cartridge housing with a novel and unique antidrainback valve.

Another object of this invention is to provide a novel and improved oil filter cartridge housing wherein the housing can be removed by a single means and taken away from the system to which it is attached and the cartridge therein can be replaced.

DESCRIPTION OF THE FIGURES

These and other objects, features and advantages will become apparent to those skilled in the art when taken in consideration with the following detailed description of one embodiment of this invention wherein like reference numerals indicate like and corresponding parts throughout the several views and wherein:

FIG. 1 is a section view of one preferred embodiment of this invention showing the overall housing system, including the integral mechanisms therein;

FIG. 5 is a side view of the antidrainback valve used with this invention;

FIG. 6 is a top view of the antidrainback valve taken along the lines 6—6 of FIG. 5;

FIG. 7 is a side view of the gasket retainer used with the embodiment as shown in FIG. 1;

FIG. 8 is a top view of the gasket retainer taken along the lines 8—8 of FIG. 7; and FIG. 9 is a section view of the antidrainback valve and the gasket retainer in their respective positions as placed within the filter housing, as shown in FIG. 1.

DESCRIPTION OF ONE PREFERRED EMBODIMENT OF THIS INVENTION

Figure 4:
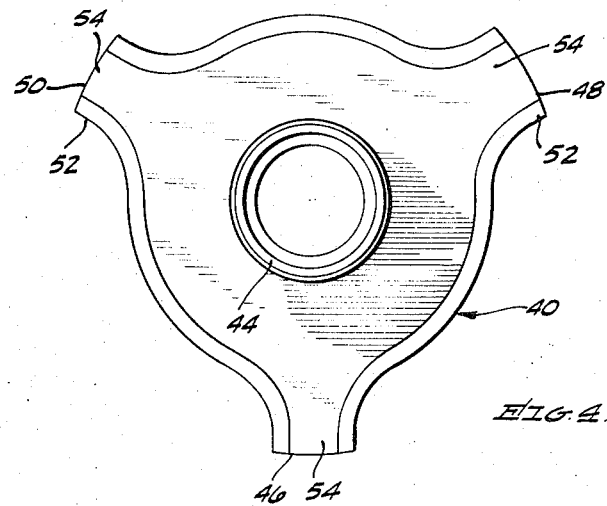
FIG. 4 is a view of the spider-clamping arrangement taken along the lines 4—4 of FIG. 3.

Turning now to FIG. 1, there is shown a section view of a filter housing 10 as it is threadably mounted into the system to which it is to perform the oil filtration thereof, which may be an automobile engine block 12, as shown in this particular embodiment. It must be understood that this particular oil filter cartridge and housing may also be useful in other types of systems, such as hydraulic fluid systems, or the like. Housing 10 is equipped with a hexagonal member 14 for tightening filter housing 10 into place in block 12. There is also provided in this embodiment a square internal member 16 wherein a square ratchet-type wrench, or the like, can be used to remove housing 10 from engine block 12.

Housing 12 may have a plurality of fins 18 running longitudinal to the vertical axis thereof which provide that housing 10 and the contents therein are easily coolable by exposure to the air through fins 18 thereof.

Housing 10 may be formed by machining, cold-press forming, or diecasting methods, or the like, and has therein a plurality of protruding locking members 20 formed on the inside thereof which will be used in reference to a spider clamping arrangement and explained in more detail as description progresses.

Inside of housing 10 is a protruding portion 22 which has a spring 24 therearound which extends inside of filter housing 10 towards engine 12. An oil filter cartridge 26, which is well known in the art, is inserted within housing 10, types of which are explained in copending patent application, Ser. No. 673,405, filed Oct. 6, 1967 on behalf of James E. Reading and assigned to the assignee of this invention, as an example of a cartridge used therein. A spring-loaded relief value 28, which includes a safety pop valve, which will be explained in connection with FIG. 1 in more detail, is provided at the opposite end of cartridge 26 and integrally sets within cylinder core 30 thereof. Relief valve 28 includes a spring 32 which bears against a top portion 27 inside portion 33.

Relief valve 28 comprises the cylindrical portion 29 defining an opening 31 therein. Portion 29 is fitted into cylinder core 30 of filter cartridge 26. Spring 32 is positioned into portion 29 and a top portion 33 is next fitted over spring 32 and has a cylindrical boss 35 which spring 32 surrounds. Relief valve 28 has a raised area 38 protruding therefrom on which portion 33 is fitted thereagainst. A gasket 36 is placed between portion 34 and portion 33 and separated therefrom by a plurality of raised portions 38. Gasket 36 may, for example, be bonded to portion 33. A plurality of holes 39 is provided in portion 34.

Figure 3:
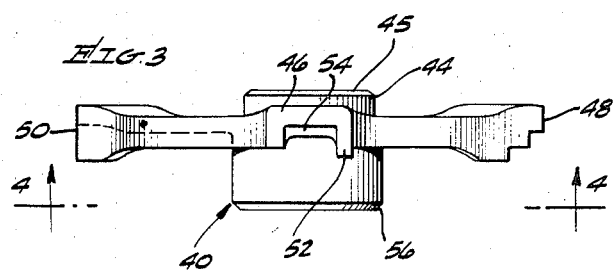
FIG. 3 is a view of the spider-clamping arrangement used to hold the filter cartridge into the housing of the preferred embodiment, as shown in FIG. 1.

The purpose of relief valve 28 is to assure oil flow through the system when cartridge 26 becomes overclogged with dirty oil and sludge. When pressure builds up in the system oil will flow through opening 39 and the pressure therefrom will force raised area 38 on portion 33 away from portion 34 and allow oil to flow out of filter housing 10 without passing through cartridge 26. A spider clamp 40, as shown in FIGS. 3 and 4, is next fitted into place and clamped within the protruding members 20. Relief valve 28 has a boss 42 which is cylindrical in shape and protrudes from valve 28 and forms a portion thereof. The shape of the spider clamping arrangement 40 is best shown in FIGS. 3 and 4 and includes a protruding cylinder member, or boss, 44 and has a threaded opening 45 which fits into member 42 of relief valve 28 and has, by this example, three clamping arms 46, 48 and 50, which includes raised portions 52 and indented portions 54. On the end opposite protruding boss 44 is a cylinder boss 56 which is internally threaded to be threadably mounted on an extruding male outlet port 60 which protrudes from housing 10, as shown in FIG. 1.

When placing a filter cartridge 26 into housing 10, cartridge 26, spring 24, and relief valve 28 are first placed into their respective positions. Next, the spider clamp 40 is positioned with boss 44 fitting into member 42 of mechanism 28. Extending arms 46, 48 and 50 are positioned to clear locking ridges 20. Pressure is brought to bear upon the internal structure of the system to overcome the spring 24 and spider clamp 40 is turned in a counterclockwise direction until detents 54 engage locking ridges 20 of housing 10. There is then provided a stable and secured self-contained floating oil filter cartridge within housing 10.

Figure 2:
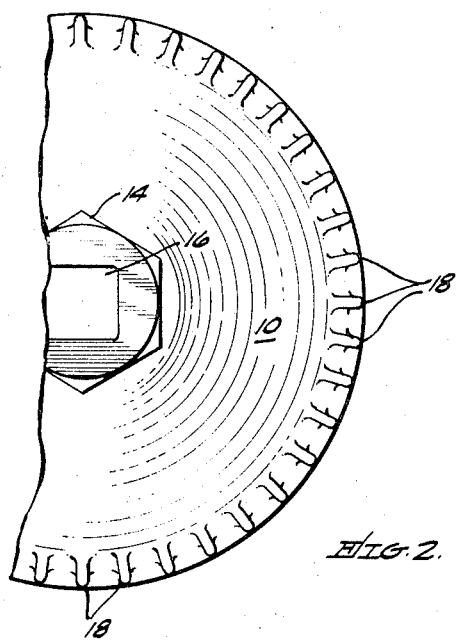
FIG. 2 is a partial view taken along the lines 2—2 of FIG. 1.

An antidrainback valve 64, as shown in FIGS. 2, 6 and 9, is next placed around the outer boss 56 of spider clamping arrangement 40. The antidrainback valve is formed of a rubber material, or the like, of a single-piece construction that has a center opening 66 therein and provides an annular diaphragm of a rather flexible material.

The valve 64 is annular in shape and has an annular skirt 68 which is relatively thin on the outer periphery and thickens up as the center portion 69 is approached. A flat portion 71 is provided near the top thereof which bears against the inner portion of spider clamp 40. The center opening of valve 64 is fitted over boss 56 of spider clamp 40 to provide a seal therebetween.

When oil pressure is applied to an inlet port 67 in engine 12 the pressure is sufficient to force thin skirt 68 of antidrainback valve 64 to an outward position, as shown in the dashed lines 65 in FIG. 9, to allow the oil to flow into the filtration system. When the oil pressure on inlet ports 66 is reduced, skirt 68 returns to its normal position and the oil contained within the housing will then bear against skirt 68 and cause a seal to prevent oil from draining back into the oil system of the engine 12.

A gasket retainer 70 is provided, as shown in FIGS. 7, 8 and 9, which fits snugly within housing 10 and may be formed of a metallic material, for example, but not limited thereto, and can again bear upon the bottom portion of protruding members 20. A slot 72 may be cut around the outer periphery of the gasket retainer 70 to hold an oil seal gasket 74 which may be a round ring formed of a rubber material, or the like. A further slot 78 is made within the gasket retainer 70 and may be cut around the inner circumferential edge of retainer 70. An oil seal gasket 74 is placed within this particular slot 78. In this particular arrangement the oil seal 80 may be square in shape, as taken along the cross-sectional view thereof, or it may be formed of a device which is rubberized material and, as shown in FIG. 1. The latter shape being preferable because as pressure is brought to bear between retainer 70 and the engine housing 12, the gasket 80 tends to flatten out and form a better seal. Skirt 68 bears upon a recessed portion 79 on gasket retainer 70.

To perform the operation of removing oil filter cartridge 26 from housing 10, a wrench, or the like, may be applied to end member 16 or hexagonal member 14 and housing 10 may be unscrewed from protruding port 60 of engine block 12. To replace the housing 24 the internal thread of spider 40 is threaded onto port 60. Upon removal of the housing, one need only press down on spider clamping arrangement 40 and twist in a clockwise position and release. At this time member 40 will be disengaged from the protruding members 20 and removable therefrom. Cartridge 26 can then be removed from oil filter housing 10 and either cleaned and replaced or disposed of and replaced with a new cartridge. Clamping member 40 can then be replaced into the housing 10 and twist in the counterclockwise motion again engages end members 50 into the protruding members 20 to again float cartridge 26 within housing 10. Gasket retainer 70 can be replaced and, if necessary, new seals 74 and 80 as well as a new valve 64 can be placed into retainer 70 and housing 10 is then threadably mounted back onto the engine 12.

Thus there has been described a filter cartridge housing which accomplishes the objects, as set forth in this invention, and it should be understood that many modifications and alterations of this invention may be made and still remain within the spirit and scope of this invention, for there has been described but one preferred embodiment thereof.

What is claimed is:

1. A filter assembly comprising:
   a housing, said housing being capable of holding a filter cartridge;
   a spring-biasing means insertable in one end of said housing between said housing and said filter cartridge;
   retaining means being capable of being coupled to said housing for retaining said filter cartridge suspended within said housing;
   a gasket retainer means insertable within said housing and including means for sealing said gasket retainer to said housing and said assembly; and
   an antidrainback valve being positioned between said gasket retaining means and said first retaining means.

2. The filter assembly, defined in claim 1, including a plurality of protruding members within said housing and wherein said retaining means includes a plurality of extending members which are biased to engage said plurality of protruding members.

3. The filter assembly, as defined in claim 1, wherein said retaining means is capable of being urged against said spring-biasing means and includes a plurality of extending members, each member of said plurality of extending members being capable of being engaged with one of a plurality of protruding members in said housing when urged against said spring-biasing means.

4. The assembly, as defined in claim 1, wherein said antidrainback valve is formed of a flexible material and comprises a diaphragm having a relatively thick inner portion defining an opening therein and a relatively thin annular skirt with relation to said thick portion around the periphery thereof.

5. The assembly, as defined in claim 4, wherein said inner portion protrudes normal to said diaphragm.

6. The assembly, as defined in claim 5, wherein said thin annular skirt is biased towards said thick inner portion.

7. The filter assembly, as defined in claim 1, and further comprising a plurality of heat-expending fins protruding from said housing and parallel therewith.

8. A self-contained filter assembly with a replaceable filter cartridge comprising:
- a housing, said housing having a first end and a second end, said second end being open to receive a filter cartridge, said housing having a plurality of inwardly extending protruding members;
- a cartridge-retainer member, said cartridge member being positionable within said housing and having a plurality of extension members, each extension of said plurality being engageable with one of said plurality of protruding members in said housing;
- means for urging said filter cartridge towards said cartridge-retaining member, said means being positioned within said housing;
- a seal-retaining member, said seal-retaining member being positioned within said housing at the inner periphery of said second end; and
- an antidrainback valve being positioned between said cartridge-retainer member and said seal-retainer member, said valve member being formed of a single-structure elastic material.

9. A filter assembly, as defined in claim 8, wherein said antidrainback valve is formed of a flexible material and comprises a diaphragm having a relatively thick inner portion defining an opening therein and a relatively thin annular skirt with relation to said thick portion around the periphery thereof.

10. The assembly, as defined in claim 9, wherein said inner portion protrudes normal to said diaphragm.

11. The assembly, as defined in claim 10, wherein said thin annular skirt being biased towards said thick inner portion.

12. A self-contained filter assembly with a replaceable filter cartridge comprising:
- a cylindrically shaped housing, said housing having a closed end and an open end, said housing being capable of receiving a filter cartridge, said housing having a plurality of locking ridges inwardly extending about the open end thereof;
- a first spring means, said first spring means being positioned near the closed end of said housing for urging the filter cartridge toward the open end of said housing;
- a first retainer means, said first retainer means having a plurality of extending members, said first retainer means being positioned in said housing near the open end thereof, the extending members of said first retainer means being engageable in the locking ridges of said housing;
- a relief valve being disposed between the filter cartridge and said first retaining means for holding said filter cartridge in position; and
- a second retainer means, said second retainer means being ring-shaped and positioned within the inner periphery of said housing near the open end thereof, said second retainer means having a first slot formed in the outer periphery of said second retainer means towards said housing for retaining a gasket between said second retainer means and said housing, said second retaining means having a second slot therein about the inner circumference on the surface facing the open end of said housing for retaining a second gasket.

13. The assembly, as defined in claim 12, and further including an antidrainback valve being positioned between said first retainer means and said second retainer means, said valve being formed of a resilient material and comprising a diaphragm having a relatively thick inner portion which protrudes normal to said diaphragm and defining an opening therein and having relatively thin annular skirt with relation to said thick portion around the periphery of said diaphragm, said annular skirt being biased toward said thick inner portion.

* * * * *